(12) United States Patent
Tenenbaum

(10) Patent No.: US 10,883,420 B2
(45) Date of Patent: Jan. 5, 2021

(54) SPLIT-CYCLE ENGINE WITH A VARIABLE DISPLACEMENT COMPRESSOR AND A ROTARY MOTOR

(71) Applicant: Jonathan Avraham Tenenbaum, Tel-Aviv (IL)

(72) Inventor: Jonathan Avraham Tenenbaum, Tel-Aviv (IL)

( * ) Notice: Subject to any disclaimer, the term of this patent is extended or adjusted under 35 U.S.C. 154(b) by 46 days.

(21) Appl. No.: 16/320,112

(22) PCT Filed: Jul. 25, 2017

(86) PCT No.: PCT/IL2017/050832
§ 371 (c)(1),
(2) Date: Jan. 24, 2019

(87) PCT Pub. No.: WO2018/020496
PCT Pub. Date: Feb. 1, 2018

(65) Prior Publication Data
US 2019/0242299 A1    Aug. 8, 2019

Related U.S. Application Data

(60) Provisional application No. 62/366,125, filed on Jul. 25, 2016.

(51) Int. Cl.
*F02B 53/08* (2006.01)
*F01B 3/00* (2006.01)
(Continued)

(52) U.S. Cl.
CPC ............... *F02B 53/08* (2013.01); *F01B 3/00* (2013.01); *F01B 3/007* (2013.01); *F01B 21/04* (2013.01); *F01C 1/22* (2013.01); *F01C 11/008* (2013.01); *F01L 1/34* (2013.01); *F01L 7/02* (2013.01); *F01L 7/06* (2013.01); *F01L 7/14* (2013.01); *F02B 33/20* (2013.01); *F02B 33/36* (2013.01);
(Continued)

(58) Field of Classification Search
CPC .. F01B 3/00; F01B 3/007; F01B 21/04; F02B 33/20; F02B 33/36; F02B 53/08; F02B 55/16; F02B 75/26; F01L 1/34; F01L 7/02; F01L 7/06; F01L 7/14; F01C 1/22; F01C 11/008; F05C 2251/048; Y02T 10/17
See application file for complete search history.

(56) References Cited

U.S. PATENT DOCUMENTS 3,073,118 A   1/1963  August
4,006,753 A   2/1977  Ingram, Jr. et al.
(Continued)

FOREIGN PATENT DOCUMENTS

CA   2620602 C    11/2012
GB   1380787 A  * 1/1975  ............. F02B 53/00

*Primary Examiner* — Audrey K Bradley

(57) ABSTRACT

A split-cycle internal combustion engine includes a variable displacement compressor having two or more cylinders, an adjustment mechanism for varying the displacement volume of the compressor and possibly the phase between the compressor and the motor, and a rotary motor having two or more expansion chambers. A passage valve system located between the compressor and the motor transfers working fluid and combustion exhaust products, and, in addition, mechanically and thermally isolates the compressor from the high pressures and temperatures present in the motor.

18 Claims, 10 Drawing Sheets

(51) Int. Cl.
  *F01C 1/22*   (2006.01)
  *F02B 33/36*  (2006.01)
  *F01L 7/02*   (2006.01)
  *F02B 75/26*  (2006.01)
  *F01C 11/00*  (2006.01)
  *F01B 21/04*  (2006.01)
  *F01L 1/34*   (2006.01)
  *F01L 7/06*   (2006.01)
  *F01L 7/14*   (2006.01)
  *F02B 33/20*  (2006.01)
  *F02B 55/16*  (2006.01)

(52) U.S. Cl.
  CPC .............. *F02B 55/16* (2013.01); *F02B 75/26* (2013.01); *F05C 2251/048* (2013.01)

(56) References Cited

U.S. PATENT DOCUMENTS

| | | | |
|---|---|---|---|
| 4,519,206 A | | 5/1985 | Van Michaels |
| 4,715,406 A | | 12/1987 | Kress |
| 4,886,024 A | * | 12/1989 | Meredith ................ F01B 3/04 |
| | | | 123/223 |
| 5,305,721 A | | 4/1994 | Burtis |
| 8,056,527 B2 | | 11/2011 | De Oliveira |
| 2008/0141921 A1 | * | 6/2008 | Hinderks ................ B63B 1/28 |
| | | | 114/274 |
| 2010/0116241 A1 | * | 5/2010 | Mistry ................ F01C 1/22 |
| | | | 123/202 |

* cited by examiner

SPLIT-CYCLE ENGINE WITH A VARIABLE DISPLACEMENT COMPRESSOR AND A ROTARY MOTOR

CROSS REFERENCES TO RELATED APPLICATIONS

This application is related to and claims priority from commonly owned U.S. Provisional Patent Application 62/366,125, entitled: "Variable displacement variable compression ratio split cycle internal combustion engine", filed on Jul. 25, 2016, the disclosure of which is incorporated by reference in its entirety herein.

TECHNICAL FIELD AND BACKGROUND

This invention relates to internal combustion engines and specifically to split-cycle engines with a variable displacement compressor and a rotary motor.

The theoretical thermal efficiency of an internal combustion engine depends primarily on compression ratio, and is highest when the compression ratio is as high as can be achieved under limitations imposed by ambient conditions, such as pressure and temperature of the surrounding air, and limitations imposed by the fuel, such as the danger of spontaneous fuel ignition at overly high compression ratios. Thus, an engine designed to have variable compression ratio has the capability of operating efficiently over a wide range of ambient conditions and fuel types.

US20160168995 to George Paul Baker Jr., dated Jun. 16, 2016 and entitled "Variable displacement system" discloses variable displacement systems, utilizing a phase relationship controller to determine and control the volumetric displacement of liquid and gas compression systems, and applications to continuously variable, constant speed power transmissions and to variable compression-ratio internal combustion engines.

WO2016055923 to Calogero Provenzano, dated Apr. 14, 2016 and entitled "Axial piston internal combustion engine" describes an axial piston internal combustion engine in which the displacement of the compressor unit is variable so as to regulate the airflow taken in by the engine and processed by a motor unit.

U.S. Pat. No. 7,353,786 to Scuderi et al., dated Apr. 8, 2008 and entitled "Split-cycle air hybrid engine" discloses a split-cycle air hybrid engine having an air reservoir connected between a compression cylinder and a power cylinder, which receives compressed air from the compression cylinder and delivers it to the power cylinder for use in transmitting power to the crankshaft during engine operation.

U.S. Pat. No. 7,383,797 to Tour, dated Jun. 10, 2008 and entitled "Double piston cycle engine" discloses a Dual Piston Cycle Engine in which a first piston performs only intake and compression strokes and a second piston performs only combustion and exhaust strokes and the first and second cylinders are thermally isolated from one another. An inter-stage valve couples an internal chamber of the first cylinder to an internal chamber of the second cylinder, and is configured to minimize dead space between the first and second cylinders.

A significant disadvantage of prior art split-cycle engines is the adoption of one basic design to both the compressor and the motor, leading to either engines with fixed compression ratio or complex variable compression ratio engines of higher weight or cost.

SUMMARY OF THE INVENTION

The present invention discloses a practical split-cycle engine with a variable displacement compressor, a rotary motor and a passage valve system that separates and isolates the compressor from the motor. The passage valve system is positioned on the plane separating the compressor from the motor, and provides thermal and mechanical isolation by means of a stack of elements having at least one static plate and at least one rotating disc. The resulting structure allows variable compression ratio and a high thermal separation between the compressor and the motor. It also allows for the implementation of variable displacement volume adjustment mechanisms, in a compact design with few complex parts.

In addition, the engine of this invention provides for an adjustment mechanism for varying compressor displacement that is well-protected from the high temperatures and pressures of the combustion stage. This leads to savings in weight and complexity of the adjustment mechanism.

The invention discloses a split-cycle engine including a variable compressor with two or more cylinders, a rotary motor with two or more expansion chambers, and a passage valve system positioned between the variable compressor and the rotary motor so as to mechanically and thermally isolate the compressor from the motor.

According to one feature of certain preferred implementations of the engine, a phase adjustment mechanism is provided which varies the phase shift between the compressor and the motor.

According to another feature of certain preferred implementations of the engine, the phase adjustment mechanism includes a helical bolt.

According to yet another feature of certain preferred implementations of the engine, a stroke adjustment mechanism is provided which varies the effective cylinder volume of the variable compressor.

According to a further feature of certain preferred implementations of the engine, the stroke adjustment mechanism includes a tilted swash plate, and/or a yoke with a spiral groove, and/or a crown-like plate.

According to another feature of certain preferred implementations of the engine, the passage valve system includes a stack of elements having at least one static plate which is operatively coupled to at least one rotating disc.

According to a further feature of certain preferred implementations of the engine, at least one element in the stack of elements includes a material having a low thermal conductivity.

According to another feature of certain preferred implementations of the engine, the material having a low thermal conductivity is a refractory metal.

According to yet another feature of certain preferred implementations of the engine, at least one element in the stack of elements includes a material having a high tensile strength.

According to still another feature of certain preferred implementations of the engine, the material having a high tensile strength is a high-carbon steel.

According to a further feature of certain preferred implementations of the engine, the passage valve system includes two or more combustion cells.

According to another feature of certain preferred implementations of the engine, an ignition system is provided which is a spark ignition system, a compression ignition system, or a homogeneous charge compression ignition system.

According to yet another feature of certain preferred implementations of the engine, the rotary motor includes a trochoidal stator.

According to a further feature of certain preferred implementations of the engine, the rotary motor includes a trochoidal rotor.

BRIEF DESCRIPTION OF THE FIGURES

The invention is herein described, by way of example only, with reference to the accompanying drawings, wherein.

DESCRIPTION OF THE PREFERRED EMBODIMENTS

The present invention is a split-cycle engine with a variable displacement compressor and a rotary motor. The principles of the present invention may be better understood with reference to the drawings and the accompanying description.

Figure 1:
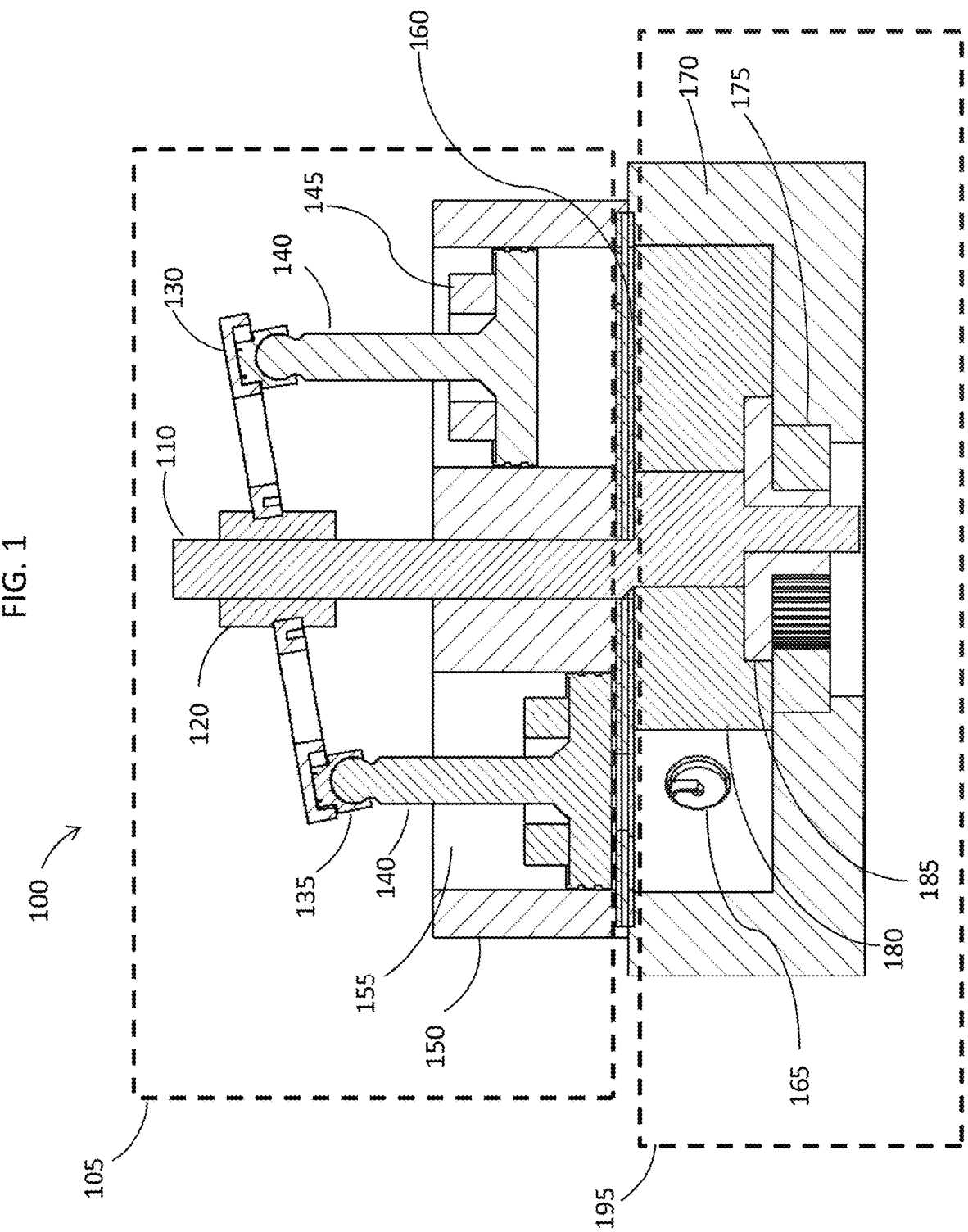
FIG. 1 is a cross-sectional view of a first embodiment of the invention.

FIG. 1 shows a cross-sectional view of a split-cycle engine 100 according to a first embodiment of the invention. Variable compressor 105 performs the engine intake and compression strokes, and rotary motor 195 performs the expansion and exhaust strokes. Passage valve system 160 regulates the flow of working fluid from variable compressor 105 to rotary motor 195, and the flow of exhaust gases in the reverse direction through the valve system and cylinder 155, and ultimately out of the engine.

Rotating shaft 110 is connected to a phase adjustment mechanism 120 and to a stroke adjustment mechanism which controls the stroke of piston 140, by adjusting the angle of tilted swash plate 130. The latter is connected by a slipper 135 to piston 140 which moves inside cylinder block 150, as shaft 110 rotates. The stroke adjustment mechanism is not shown explicitly in FIG. 1, as many designs for this mechanism are familiar to those skilled in the art of engine design.

On intake, piston 140 slides in the direction away from rotary motor 195, reaching its highest position when the cylinder volume is at its maximum value. This condition is illustrated by the right-hand cylinder in FIG. 1. During intake, air enters the cylinder through air passages in the cylinder block and/or piston. On compression, the piston slides towards rotary motor 195, reaching its lowest position when the cylinder volume is at its minimum value. This condition is illustrated by the left-hand cylinder in FIG. 1. During compression, the above-mentioned air passages are sealed to allow the piston to compress the working fluids.

Phase adjustment mechanism 120 controls the phase shift between variable compressor 105 and rotary motor 195—a larger phase shift corresponds to a larger clearance volume in the motor, at a given pressure. The use of phase adjustment mechanism 120 together with a separate stroke adjustment mechanism allows for independent control of the engine compression ratio and the compressor volume.

Intake valve 145, through which working fluids are inserted to the compressor, may be any valve that allows passage of fluids in predetermined conditions. Since only intake and compression strokes occur in the compressor, intake valve 145 may be a one-way valve, or check valve, which allows working fluids to enter the cylinder when the pressure external to the cylinder exceeds that inside the cylinder, and prevents high pressure working fluids from escaping the cylinder.

Variable compressor 105 may optionally include a cooling mechanism, which enables the compression process to achieve higher thermodynamic efficiency than that achievable by adiabatic cooling alone.

Although FIG. 1 shows an engine with two cylinders and combustion chambers, those skilled in the art of engine design can easily apply the principles of the invention to engines having more than two cylinders and combustion chambers.

Passage valve system 160 includes one or more static plates and one or more rotating discs, that create ports, or apertures, which open and close in accordance with the strokes of engine 100. In addition to its normal functioning as a regulator of fluid flow, passage valve system 160 also provides mechanical and thermal isolation between the hot, high-pressure rotary engine 195 and the relatively cool variable compressor 105. Further details of passage valve system 160 are provided in subsequent figures.

Rotary motor 195 includes a stator 170 and stator gear 175, which do not rotate, and a rotor 180 and rotor gear 185. The axis of rotor gear 185 is parallel to but displaced from the axis of rotating shaft 110.

Two combustion cells are formed in the volume trapped between stator 170 and rotor 180. The latter volumes reach their maximum value at the end of the expansion stroke and their minimum value at the end of the exhaust stroke.

Fuel is introduced into the combustion cell by any one of a variety of methods known to those skilled in the art of engine design. For example, fuel may be introduced through a carburetor or by fuel injectors inside the combustion cell, piston 140, or at another location inside the engine.

Working fluid inside the combustion cell is ignited by spark plug 165. Alternatively, ignition may be provided by other means, such as compression ignition or homogeneous charge compression ignition, as is familiar to those skilled in the art of engine design.

Stator 170 may be a trochoid and rotor 180 an envelope, as in Wankel type rotary engines, or alternatively, rotor 180 may be a trochoid and stator 170 an envelope. In any trochoidal or other rotary motor design, it is preferable to design a motor with the possibility to install apex seals in the stator instead of on the rotor; thus providing easier access to the seals. A second design consideration is the possibility to nullify clearance volume, so as not to reduce the pressure of working fluid taken in from the compressor. Stator gear 175 and rotor gear 185 are similar in principle to those used in Wankel-type rotary engines.

Figure 2:
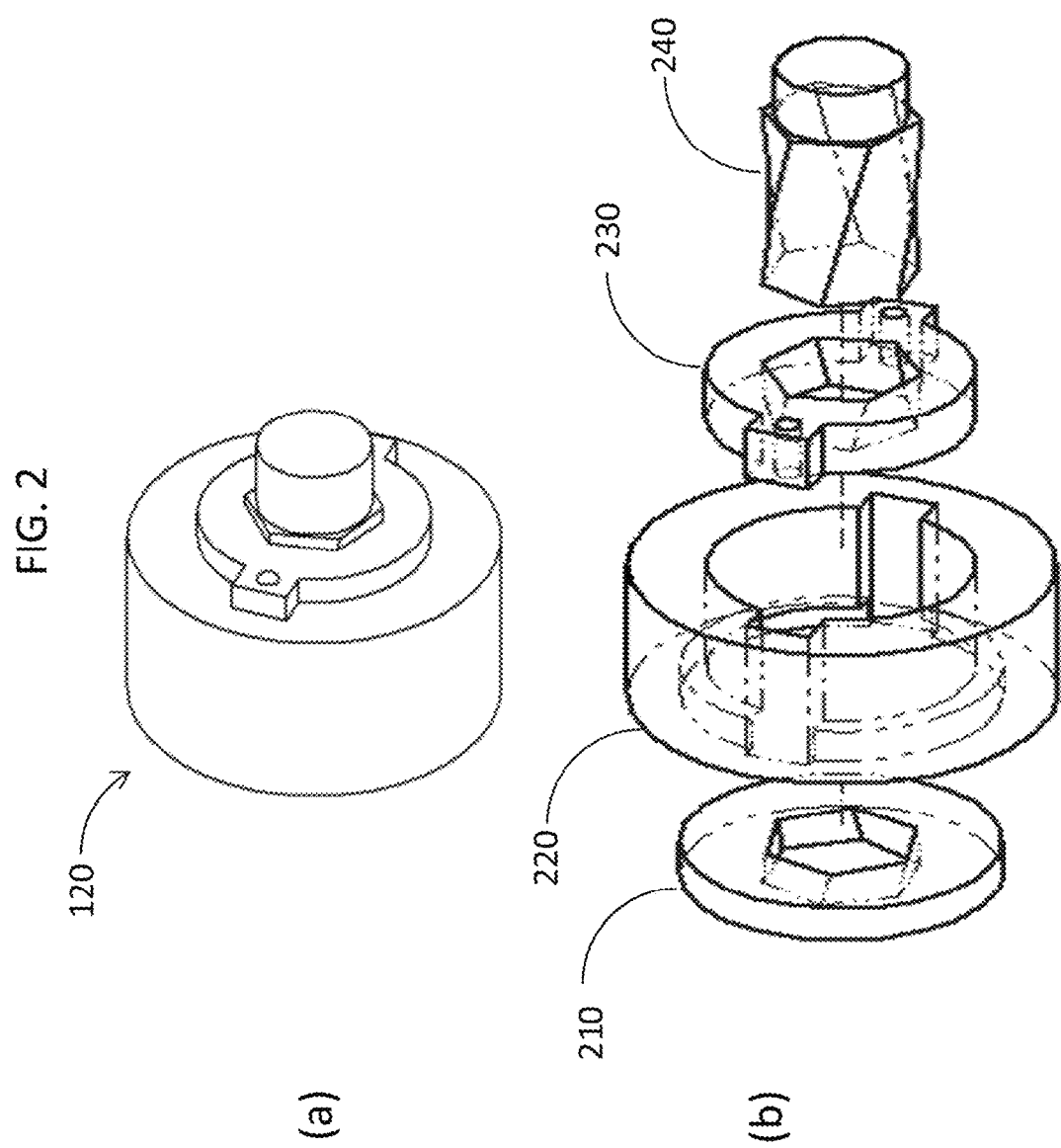
FIG. 2 is (a) a perspective view and b) an exploded view of an exemplary phase adjustment mechanism according to the embodiment of FIG. 1.

FIG. 2(*a*) shows a perspective view of phase adjustment mechanism 120, and and FIG. 2(*b*) shows a corresponding exploded view. Nut 230 fits into yoke 220, which is connected to swash plate 130. Helical bolt 240 is inserted through nut 230 and bearing 210, as shown. Actuation of the phase adjustment mechanism involves sliding nut 230 along the axis of bolt 240. This changes the phase of yoke 220 relative to bolt 240. The hexagonal shape of helical bolt 240 is for exemplary purposes; other geometric shapes are also possible, within the spirit and scope of this disclosure.

Figure 3:
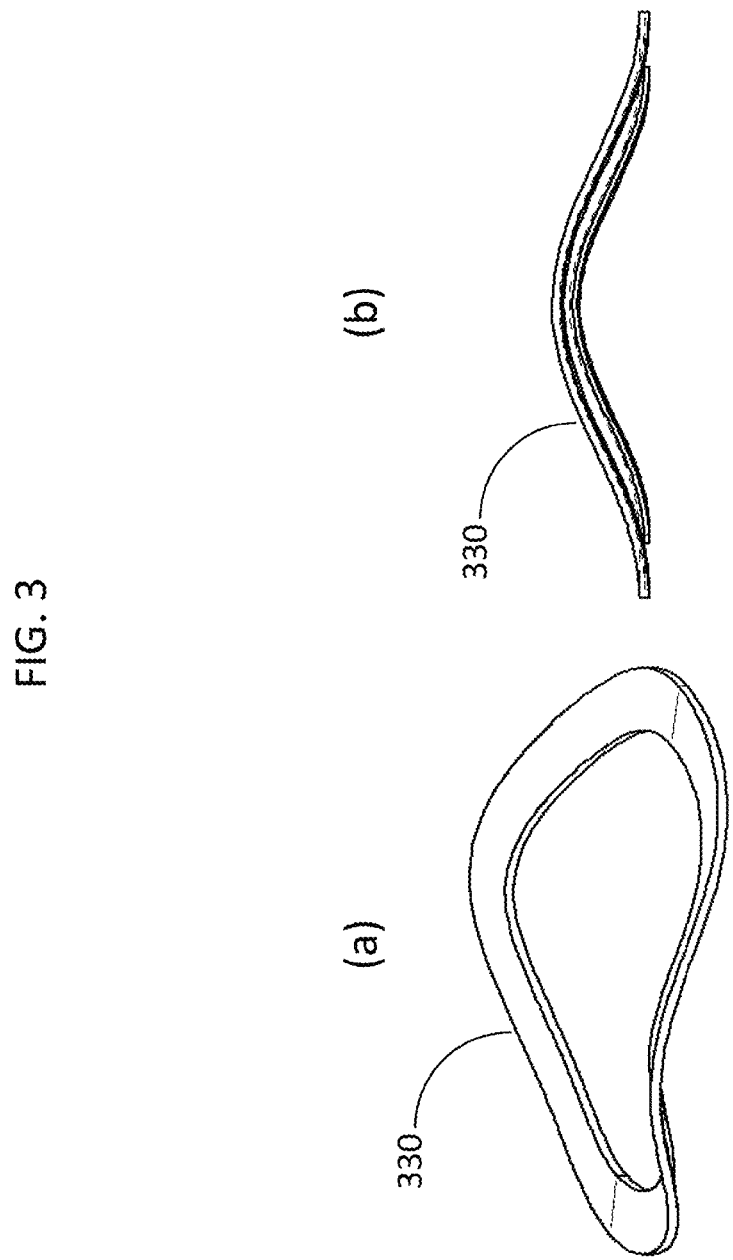
FIG. 3 is (a) a perspective view and (b) a side view of an exemplary crown-like plate.

FIG. 3(*a*) shows a perspective view, and FIG. 3(*b*) a side view, of an exemplary crown-like plate 330. Such a plate may be used in place of swash plate 130, in a configuration in which pistons 140 and cylinder block 150 rotate with respect to stator 170 and crown-like plate 330 is static. In this case, pistons 140 go up and down as they rotate, in response to the non-planar shape of crown-like plate 330. One advantage of such a configuration is reduced complexity of the associated passage valve system.

Figure 4:
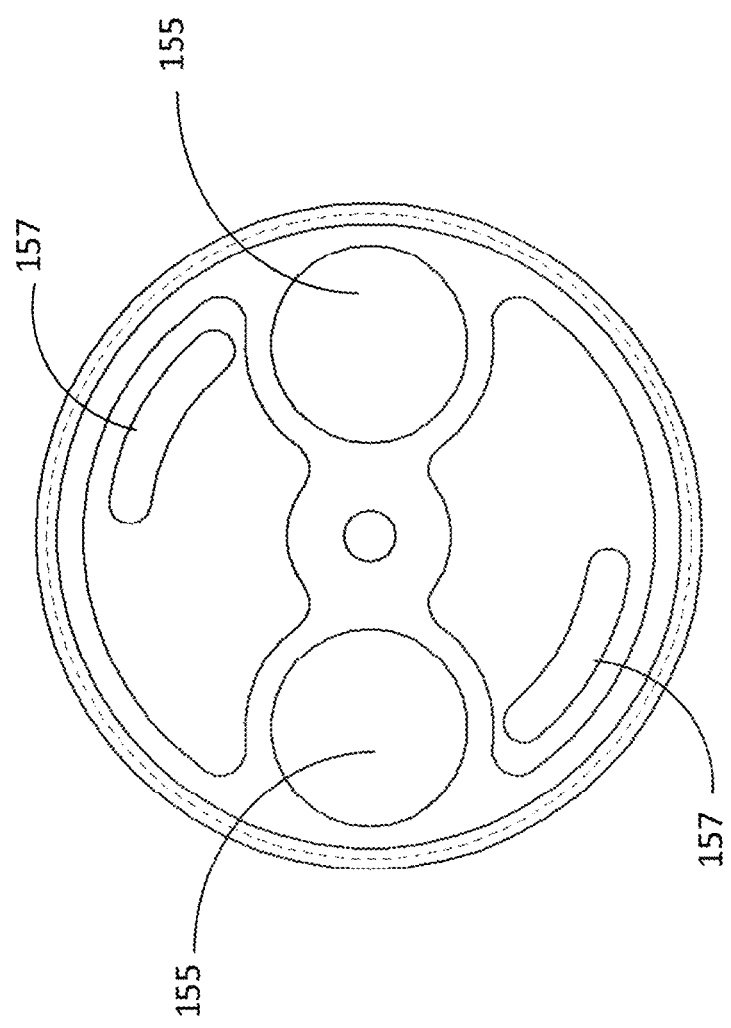
FIG. 4 is a cross-sectional top view of the variable compressor in FIG. 1.

FIG. 4 is a cross-sectional top view of the variable compressor in FIG. 1, showing the location of exhaust gas outlet ports 157 with respect to cylinders 155.

Figure 5:
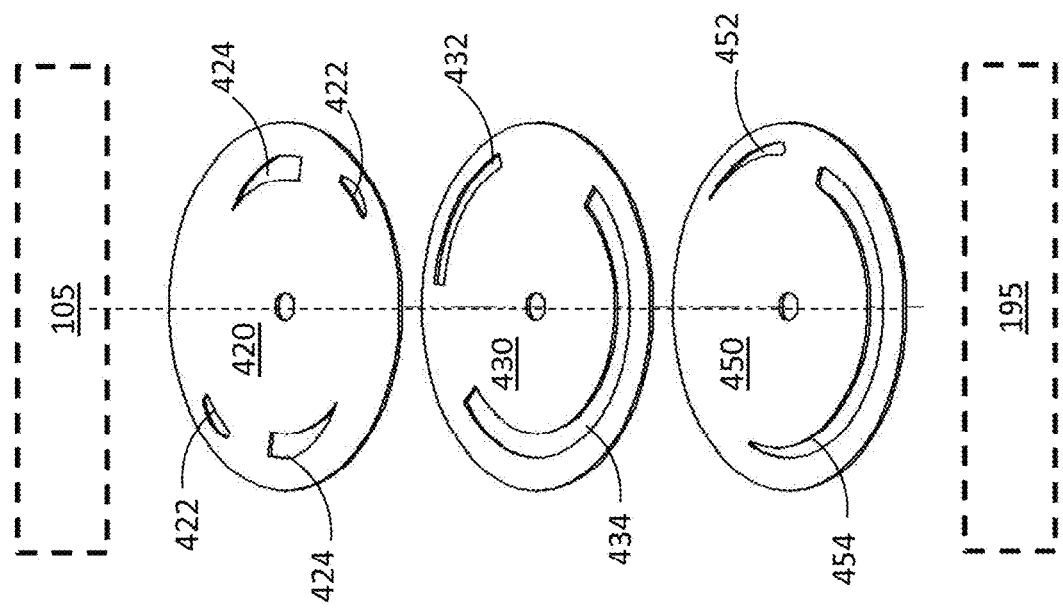
FIG. 5 is an exploded view of a first exemplary passage valve system according to the invention.

FIG. 5 is an exploded view of a first exemplary passage valve system according to the invention. Passage valve system 160 has a static plate 420, a cold rotating disc 430, and a hot rotating disc 450. On assembly, the plate and two rotating discs are stacked on top of each other, so that overlapping areas of the ports form effective openings through which working fluids may flow from variable compressor 105 to rotary motor 195, and combustion products may flow to the exhaust system. The ordering of the plate and two rotating discs within the stack may be changed from that shown in FIG. 5, without affecting the overlapping areas during operation.

Static plate 420, which is shown closest to variable compressor 105, is connected to stator 170. It includes two static compressor ports 422 (one for each of the two compressor cylinders 155 in variable compressor 105) and two static exhaust ports 424 (one for each of the two combustion cells in rotary motor 195).

Cold rotating disc 430 rotates together with rotating shaft 110 and is synchronized in phase with compressor 105. It includes two ports: a rotor compressor port 432 which partially obstructs static compressor ports 422 and a rotor exhaust port 434 which partially obstructs static exhaust ports 424.

Hot rotating disc 450, which is shown closest to rotary motor 195, also rotates together with rotating shaft 110 and is synchronized in phase with rotor 180. It includes two ports: a compression synchronization port 452 which partially obstructs rotor compressor port 432 and an exhaust synchronization port 454 which partially obstructs rotor exhaust port 434.

The instantaneous temperature difference between cold rotating disc 430 and hot rotating disc 450 varies with engine stroke, machining tolerances, fuel type, compression ratio, and various other factors. Typical peak temperature differences generally fall in the range of 500 to 3,000 degrees Celsius.

The passage valve system of FIG. 5 is designed to isolate variable compressor 105 from the high temperatures and mechanical stresses present in rotary motor 195. At the same time, the plate and discs should be made be as thin as possible to prevent unnecessary expansion of the working fluid. Candidate materials capable of withstanding high mechanical stress are typically those having high values of tensile strength. For example, values of tensile strenth greater than 400 megapascals (MPa) may be achieved using various steel alloys, such as high-carbon steel.

Hot rotating disc 450 may serve as the surface on which the rotor slides as it rotates around the shaft. Alternatively, an additional static plate may be used to separate the rotor from hot rotating disc 450. The latter should preferably be made of materials which thermally isolate variable compressor 105 from the high temperatures in rotary motor 195. Candidate materials include refractory metals having low thermal conductivity, typically less than 180 watts per meter per degree Celsius at a temperature of 500 degrees Celsius. Molybdenum, Tungsten, and Tantalum are examples of such refractory metals. Ceramic coatings may also be applied to further reduce the thermal conductivity of the rotating discs.

Figure 6:
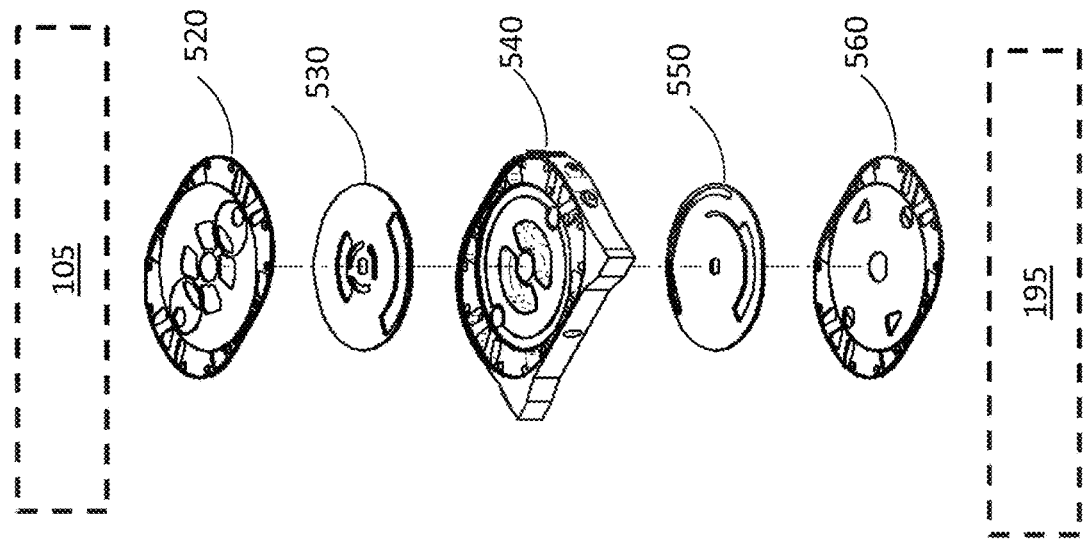
FIG. 6 is an exploded view of a second exemplary passage valve system according to the invention.
Figure 7:
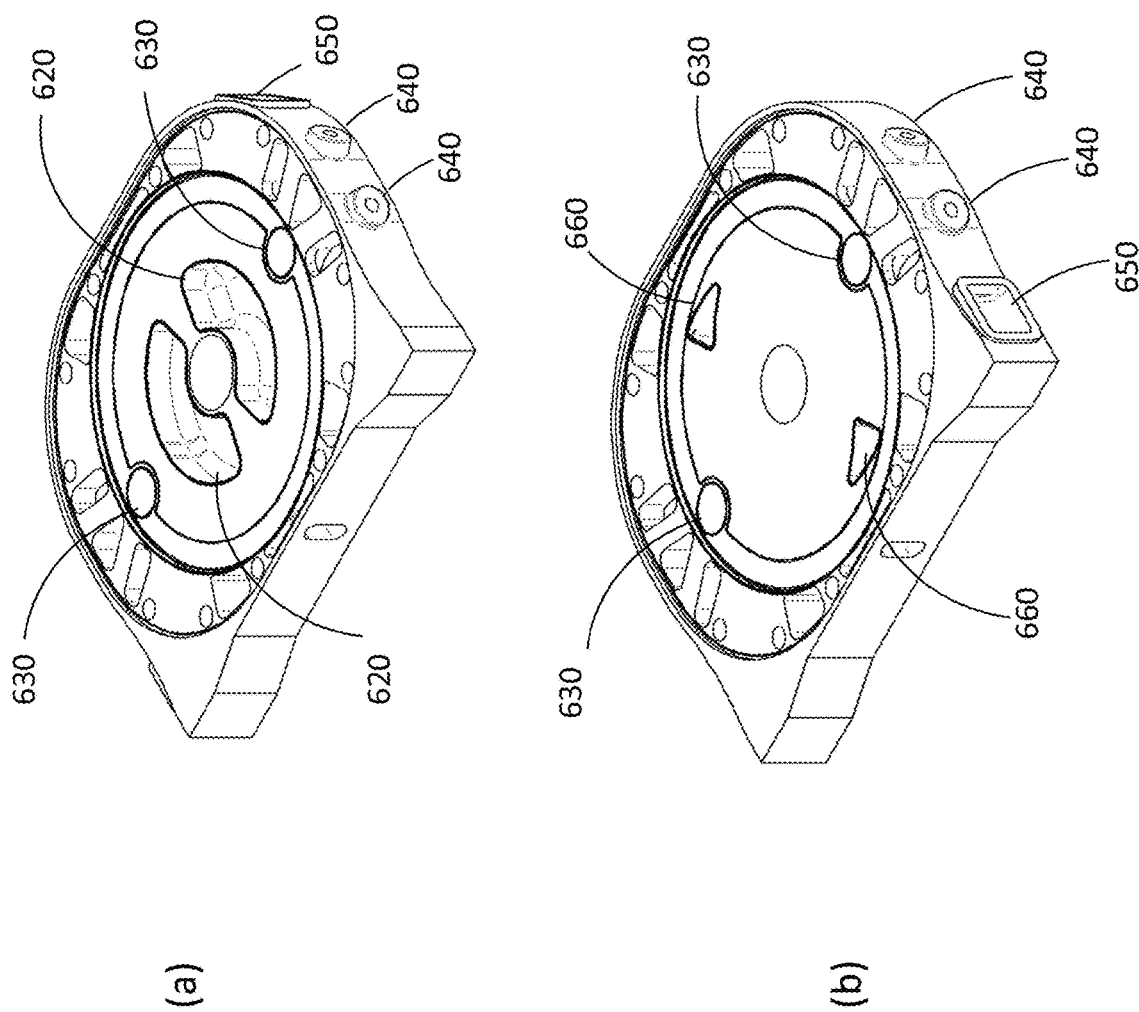
FIG. 7 is (a) a top perspective view and (b) a bottom perspective view of the second exemplary passage valve system of FIG. 6.

A second exemplary passage valve system is shown in an exploded view in FIG. 6, in a top perspective view in FIG. 7(*a*), and in a bottom perspective view in FIG. 7(*b*). In FIG. 6, the stack of the passage valve system consists of a cold static plate 520, a cold rotating disc 530, a combustion cell assembly 540, a hot rotating disc 550, and a hot static plate 560. As in the first exemplary passage valve system, the stack of the passage valve system is sandwiched between variable compressor 105 and rotary motor 195. The volume beneath the variable compressor can be used as intake air pockets, which are separated from compressor cylinders 155 by cold rotating disc 530. This allows disc 530 to serve also as an intake valve, without the need for additional parts. Additionally, combustion cells of cylindrical shape with constant volume provide superior conditions for rapid flame development compared to the combustion chambers of the first embodiment.

The top perspective view in FIG. 7(*a*) shows the combustion cells 630 facing the compressor; intake air pockets 620, spark plugs 640, and exhaust outlet 650. The bottom perspective view in FIG. 7(*b*), facing the rotary motor, shows, additionally, exhaust ports 660.

Figure 8:
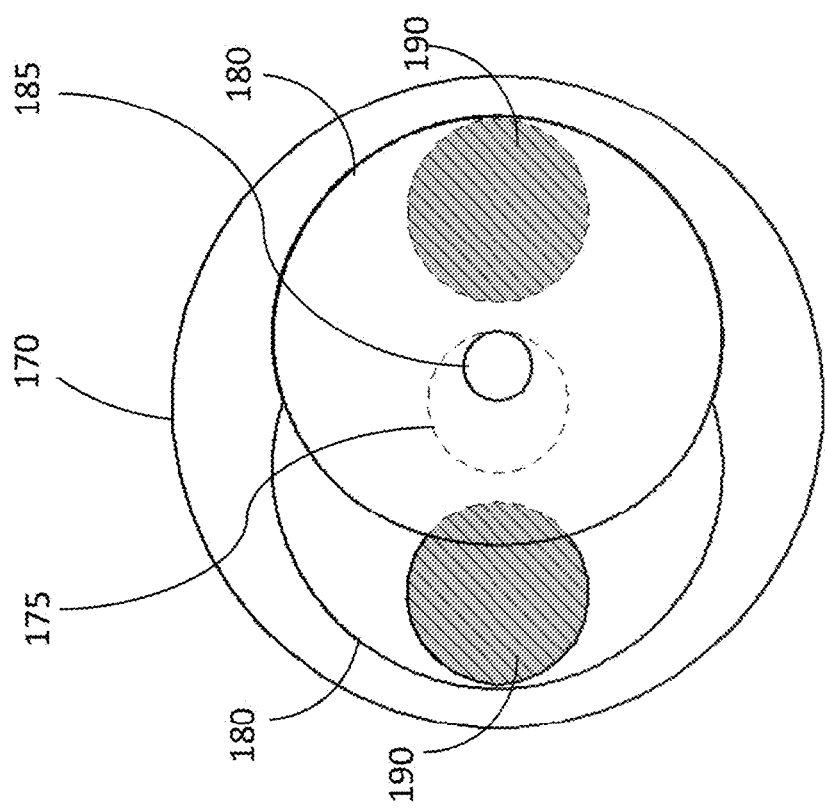
FIG. 8 is a cross-sectional view of an exemplary rotary motor with two expansion chambers according to the invention.

FIG. 8 is a cross-sectional view of an exemplary rotary motor 195 having two expansion chambers, consisting of a stator 170, a stator gear 175, two rotors 180, a rotor gear 185. and two pistons 190.

Figure 9:
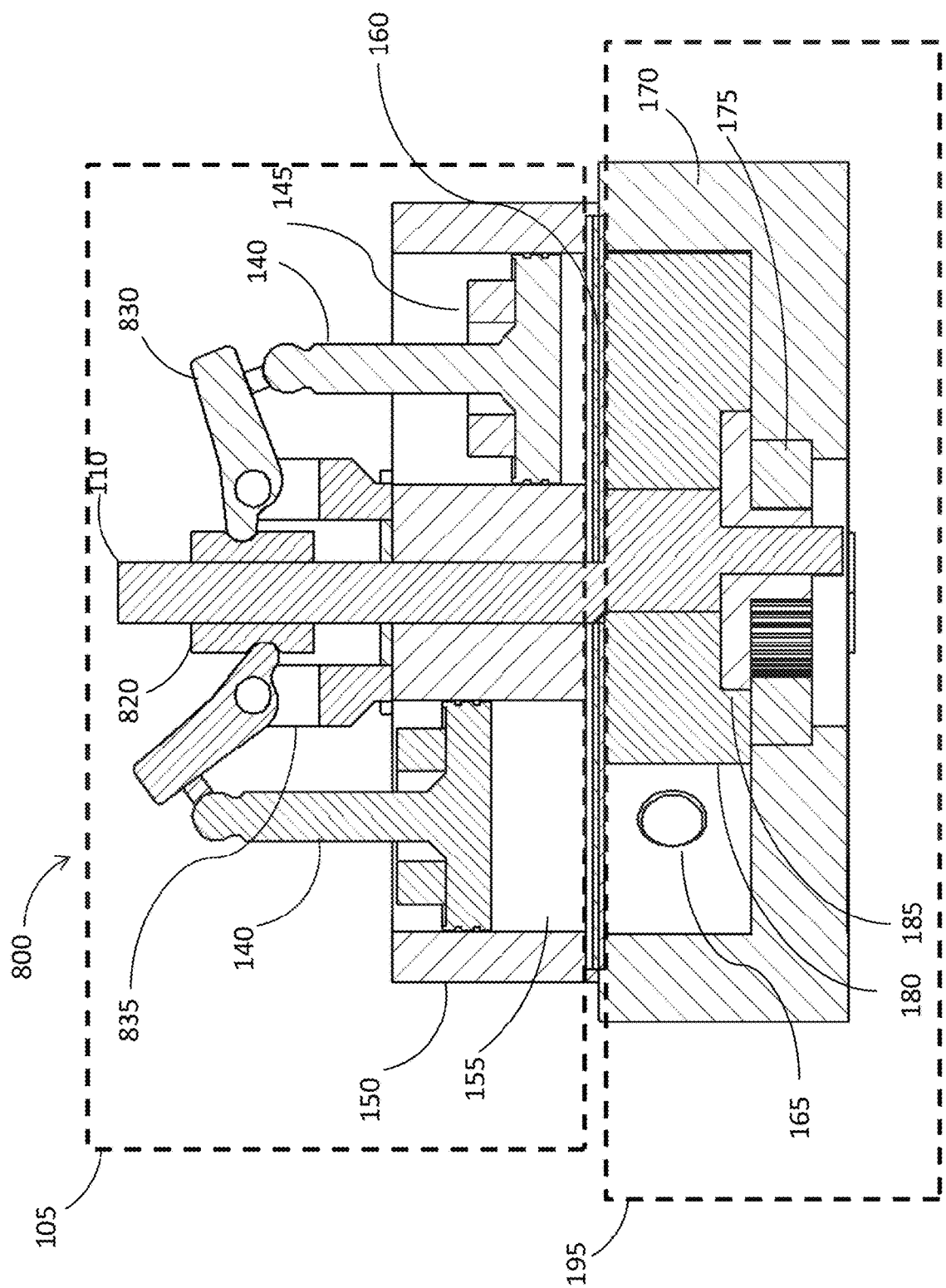
FIG. 9 is a cross-sectional view of a second embodiment of the invention.

FIG. 9 is a cross-sectional view of a split-cycle engine 800 according to a second embodiment of the invention. FIG. 9 uses the same reference numbers as FIG. 1 for like components. In FIG. 9, rotating shaft 110 is connected to a stroke adjustment mechanism 820, which controls the extension of rocker arm 830. Rocker arm 830 is mounted on rocker fork 835 and is connected to piston 140, causing the piston to move up and down inside cylinder 155, as shaft 110 rotates.

Figure 10:
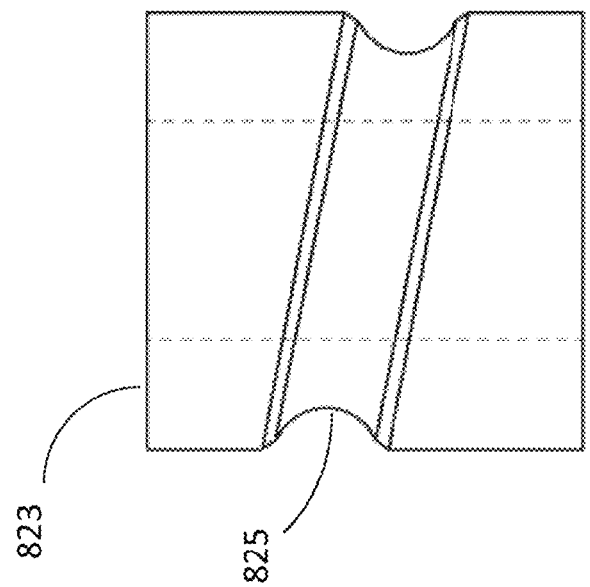
FIG. 10 is a side view of an exemplary stroke adjustment mechanism, according to the embodiment of FIG. 9.

FIG. 10 is a side view of exemplary stroke adjustment mechanism 820 of FIG. 9. Yoke 820, which surrounds rotating shaft 110, has a spiral groove 825. Rocker arm 830 moves along spiral groove 825 as shaft 110 rotates. The axial height of yoke 820 on shaft 110 may be varied in order to change the extension of rocker arm 830, and thus to change the effective travel of piston 140 inside cylinder 155.

It should be noted that the embodiments of the invention may require additional peripheral systems such as a carburetor, fuel injectors or other, a cooling system, a lubrication system, sensor systems, and other systems that are known to those skilled in the art of engine design, but which are not essential to an understanding of the invention.

It will be appreciated that the above descriptions are intended only to serve as examples, and that many other embodiments are possible. For example, spark plug ignition may be replaced by a different ignition system, such as a compression ignition system or a homogeneous charge compression ignition system. As another example, the embodiments of FIG. 1 and FIG. 8 may be extended to include configurations in which the number of cylinders in variable compressor 105 is less than, equal to or greater than the number of combustion cells in rotary motor 195. As yet another example, the piston, rotor and stator may have a variety of shapes other than those shown in the exemplary drawings.

Thus, although the invention has been described in conjunction with specific embodiments, it is evident that many alternatives, modifications, and variations will be apparent to those skilled in the art. Accordingly, the invention is intended to embrace all such alternatives, modifications, and variations that fall within the spirit and broad scope of the invention, as defined in the appended claims.

The invention claimed is:

1. A split-cycle engine comprising:
    (a) a variable compressor comprising two or more cylinders;
    (b) a rotary motor, comprising two or more expansion chambers;
    (c) a passage valve system in communication with said variable compressor and said rotary motor, configured to mechanically and thermally isolate said variable compressor from said rotary motor; and
    (d) a phase adjustment mechanism for varying a phase shift between said variable compressor and said rotary motor; said phase adjustment mechanism comprising a helical bolt and in mechanical communication with said compressor and/or said rotary motor.

2. The engine of claim 1, wherein said passage valve system comprises two or more combustion cells.

3. The engine of claim 1, wherein said rotary motor comprises a trochoidal stator or a trochoidal rotor.

4. The engine of claim 1, further comprising a stroke adjustment mechanism.

5. The engine of claim 4, wherein said stroke adjustment mechanism comprises at least one of a tilted swash plate, a yoke with a spiral groove, and a crown-shaped plate.

6. The engine of claim 1, wherein said passage valve system comprises a stack of elements including at least one static plate operatively coupled to at least one rotating disc.

7. The engine of claim 6, wherein at least one element of said stack of elements comprises a material having a thermal conductivity whose value is less than 180 watts per meter per degree Celsius at a temperature of 500 degrees Celsius.

8. The engine of claim 6, wherein at least one element of said stack of elements comprises a refractory metal.

9. The engine of claim 6, wherein at least one element of said stack of elements comprises a material with a high tensile strength whose value is greater than 400 megapascals.

10. The engine of claim 6, wherein at least one element of said stack of elements comprises a high-carbon steel.

11. The engine of claim 6, wherein said rotating disc comprises one or more ports to regulate a flow of a working fluid and/or of exhaust products.

12. A split-cycle engine comprising:
    (a) a variable compressor comprising two or more cylinders;
    (b) a rotary motor, comprising two or more expansion chambers; and
    (c) a passage valve system in communication with said variable compressor and said rotary motor, configured to mechanically and thermally isolate said variable compressor from said rotary motor;
wherein said passage valve system comprises a stack of elements including at least one static plate operatively coupled to at least one rotating disc, and said at least one static plate comprises two or more combustion cells.

13. The engine of claim 12, wherein said rotating disc comprises one or more ports to regulate a flow of a working fluid and/or of exhaust products.

14. The engine of claim 12, wherein at least one element of said stack of elements comprises a material having a thermal conductivity whose value is less than 180 watts per meter per degree Celsius at a temperature of 500 degrees Celsius.

15. The engine of claim 12, wherein at least one element of said stack of elements comprises a refractory metal.

16. The engine of claim 12, wherein at least one element of said stack of elements comprises a material with a tensile strength whose value is greater than 400 megapascals.

17. The engine of claim 12, wherein at least one element of said stack of elements comprises a high-carbon steel.

18. The engine of claim 12, wherein said rotary motor comprises a trochoidal stator or a trochoidal rotor.

* * * * *